United States Patent [19]
Ziegler

[11] 3,943,036
[45] Mar. 9, 1976

[54] FAST BREEDER REACTOR

[75] Inventor: Albert Ziegler, Erlangen, Germany

[73] Assignee: Siemens Aktiengesellschaft, Berlin and Munich, Germany

[22] Filed: May 16, 1973

[21] Appl. No.: 360,903

Related U.S. Application Data

[63] Continuation-in-part of Ser. No. 75,369, Sept. 25, 1970, abandoned.

[30] Foreign Application Priority Data
Sept. 27, 1969 Germany............................ 1948901

[52] U.S. Cl. ...................... 176/18; 176/40; 176/61; 176/78
[51] Int. Cl............................................ G21c 15/02
[58] Field of Search ............. 176/17, 18, 40, 61, 78

[56] References Cited
UNITED STATES PATENTS

| | | | |
|---|---|---|---|
| 3,011,962 | 12/1961 | Koch et al. ........................ | 176/17 |
| 3,205,147 | 9/1965 | Foure et al. ........................ | 176/61 |
| 3,271,260 | 9/1966 | Noderer............................... | 176/18 |
| 3,395,077 | 7/1968 | Tong et al........................... | 176/61 |
| 3,549,493 | 12/1970 | Germer................................. | 176/18 |

Primary Examiner—Harvey E. Behrend
Attorney, Agent, or Firm—Herbert L. Lerner

[57] ABSTRACT

Fluid-cooled fast breeder reactor includes an outer cylindrical boundary wall, a plurality of canless fuel elements and breeder material elements received within the boundary wall and being in an array therein forming a fissionable fuel zone and a breeder material zone coaxially surrounding the fissionable fuel zone, a coolant supply system for applying fluid coolant at uniform pressure to the entire cross section within the cylindrical boundary wall, and flow guide devices extending substantially horizontally and disposed at different levels one above the other within the breeder material zone which coaxially surrounds the fissionable fuel zone, means for elastically securing the flow guide devices at alternate levels within the breeder material to the boundary wall, the flow guide devices at the levels intermediate the alternate levels being spaced by an annular gap from the boundary wall.

7 Claims, 7 Drawing Figures

FAST BREEDER REACTOR

This is a continuation-in-part application of application Ser. No. 75,369, filed Sept. 25, 1970 now abandoned.

The invention relates to a fast breeder nuclear reactor having fluid cooling, preferably liquid metal cooling and canless fuel elements in the fissionable fuel zone or core thereof.

The breeder reactor differs from a normal or ordinary nuclear reactor in that the breeder reactor is constructed of at least two regions or zones which differ basically in their function. The core zone is arrayed with fissionable fuel elements in which there occurs a controlled chain reaction for splitting $U_{235}$ or plutonium atoms, with the development of very great quantities of heat. A breeder material zone or breeder mantle is located outside the fissionable fuel core zone and has a construction similar to that of the core zone, but contains, however, in the elements thereof i.e. the breeder elements, no nuclear fuel but rather so-called breeder material such as $U_{238}$. Due to neutron capture from the reactor core proper, the $U_{238}$ atoms are transferred or transmuted into plutonium atoms and thereby into fissionable fuel. Heat production in this zone is relatively small compared to the heat produced in the nuclear fuel zone, and the differences with respect to the heat power per volume element are even greater. The same coolant such as, for example, steam (vapor), gas or primarily liquid metal like sodium, potassium, etc., is normally employed for cooling both zones.

Since the efficiency of the transformation of the produced heat to electrical energy depends very greatly on the final temperature of the coolant, measures must be taken to have the outlet temperature of the coolant overall uniform i.e. over the entire cross section of the breeder reactor. To attain this objective, it has been proposed heretofore to surround the individual fuel elements and breeder material elements with a metallic mantle so that the inner space of the entire reactor is formed of a multiplicity of such coolant channels subdividing the flow. It is accordingly possible to so shape the core zone of the breeder reactor, wherein the fuel elements are disposed, that in addition to the reduction of the so-called void coefficients, the temperature release is the same from all of the fuel elements. In the breeder mantle, however, this uniformity of the thermal release is no longer present because the power output of the individual breeder elements is no longer constant with time but rather, in the course of the operating time increases in proportion to the growth of plutonium. The coolant throughput through this zone must therefore first be throttled so that the outlet temperature is virtually the same as that from the core zone. Moreover, the heretofore required throttling devices must be adjustable from the outside in order to do justice to the change in the power release due to the increasing plutonium production. Another possibility is to provide within the breeder material zone various regions with different coolant throughput and to transform the breeder material element continuously within these regions in accordance with the plutonium formation therein.

This construction of the fuel and breeder material zones has the disadvantage that a considerably pressure difference occurs between the inner space of the fuel and breeder material elements, on the one hand, and the gap therebetween, on the other hand. Since there is virtually no flow in the gaps between the fuel elements, the foot thereof between the mantles, boxes or cases of these elements is at coolant outlet pressure. This pressure difference, which can be of the order of magnitude of 4 atmospheres absolute, for example, has an effect upon the fuel element mantle or casing, and these must therefore be given a suitable wall thickness in order to avoid mechanical deformations and bends or distortions. The additional structural material costs moreover impairs the breeding rate of the entire reactor; also the mechanical long-term characteristics of these casing or cans at the high neutron flux density are not to be overlooked.

It should also be noted that in addition to the pressure-loading, a strong bending of the casing or can in the order of magnitude of centimeters occurs due to the radially decreasing irradiation intensity by fast neutrons and the threshold effect of the structural material required thereby. Mechanical prevention of such bending, for example by tension or clamping members, is impossible.

The question was therefore than raised if it were possible to construct the fuel elements without any outer mantle or casing as for light water reactors i.e. as so-called open or canless fuel elements. No close approach could be made, however, to this idea because the disadvantages with respect to the efficiency that were associated therewith, no possibility of controlling the coolant flow, were too difficult to overcome.

It is accordingly an object of the invention to provide a fast breeder reactor which avoids the foregoing disadvantages of the heretofore known devices of this general type.

More specifically, it is a further object of my invention to provide a fast breeder reactor wherein a uniform outlet temperature of the coolant over the entire reactor cross section is afforded by employing canless fuel and breeder material elements.

With the foregoing and other obejcts in view, I provide in accordance with my invention fluid-cooled fast breeder reactor comprising an outer cylindrical boundary wall, a plurality of fuel elements and breeder material elements of canless construction received within the boundary wall and being in an array therein forming a fissionable fuel zone and a breeder material zone coaxially surrounding the fissionable fuel zone, a coolant supply system for applying fluid coolant at uniform pressure to the entire cross section within the cylindrical boundary wall, and flow guide devices extending substantially horizontally and disposed one above the other within the breeder material zone which coaxially surrounds the fissionable fuel zone, the flow guide devices, respectively, being alternately elastically secured to the boundary wall and spaced by an annular gap therefrom.

With this arrangement of guide devices, the coolant flow streaming through the breeder mantle is increased in length and the flow resistance is thereby increased so that for considerably reduced flow quantities, in this section the same outlet temperatures as in the fuel region are attained. The solution for this problem is achieved thus with a forced transverse flow in the breeder regions. An apparently even simpler solution, namely the introduction of a partition between the core zone and the breeder mantle must be replaced about every three years due to the radiation load and the reduction in the mechanical properties associated therewith, a fact which ought to lead to no inconsiderable difficulties with the large diameter. Another apparently simple solution would be the increasing of the flow resistance within the breeder mantle due to reduction of the spacings between the individual fuel rods. This is not technically feasible because the spacings must become small, so that for the slow flow rates, depositions would not be avoidable and would clog the element.

Other features which are considered as characteristic for the invention are set forth in the appended claims.

Although the invention is illustrated and described herein as embodied in fast breeder reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
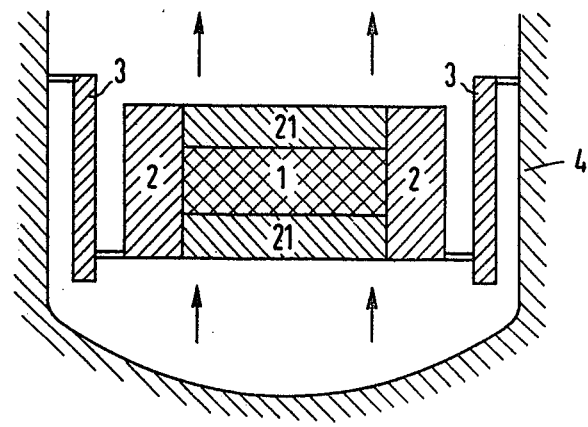
FIGS. 1 and 2 are diagrammatic sectional views of different embodiments of the fast breeder reactor of my invention.

Referring now to the drawing, and first, particularly, to FIG. 1 thereof there is shown a very generalized construction of a fast breeder reactor. The chain reaction occurs in the nuclear reactor core zone 1 proper which is surrounded by a radial breeder mantle 2 and axial breeder zones 21 located above and below the reactor core 1. A thermal shield 3 mounted in a reactor vessel 4 is located outside the reactor core 1. Coolant flow is indicated by the arrows. The formation or development of the axial breeder material zones 21 is produced by charging the upper and lower ends of the fuel elements forming the reactor core zone 1 with breeder material. Thus no special elements are required for the axial breeder zones, in contrast to the radial breeder mantle zone 2.

Figure 2:
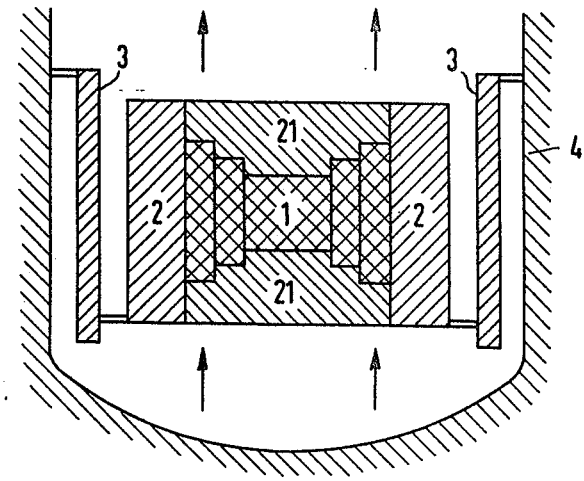
Figure 3:
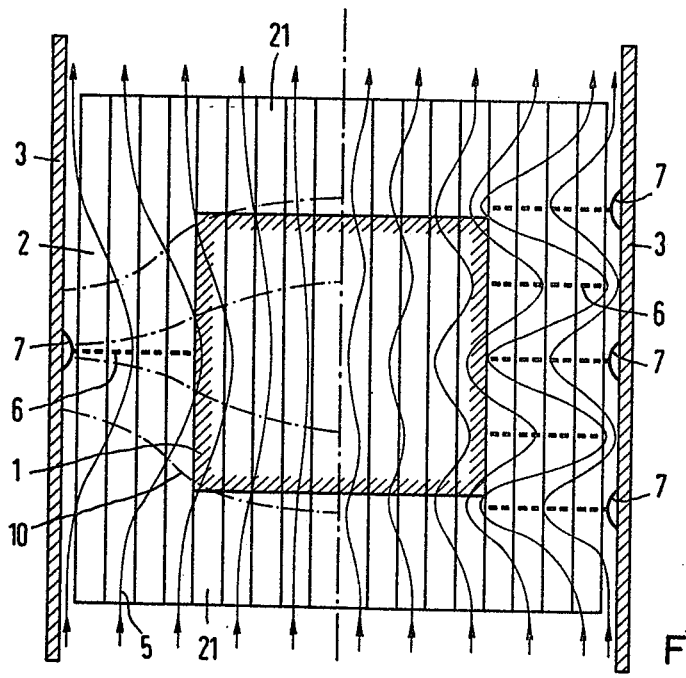
FIG. 3 is an enlarged diagrammatic sectional view of the fissionable fuel and breeder material zone of the embodiment of FIG. 1 diagrammatically showing the flow guide devices thereof.
Figure 4:
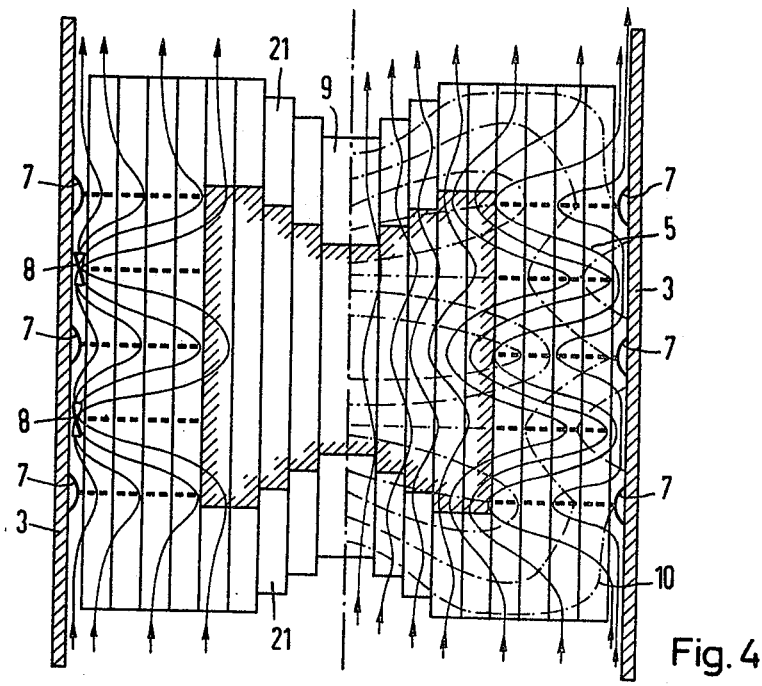
FIG. 4 is an enlarged diagrammatic sectional view of the fissionable fuel and breeder material zones of the embodiment of FIG. 2 diagrammatically showing the flow guide devices thereof.

In FIG. 2 there is shown a construction of the nuclear fuel zone wherein uniform thermal release occurs in all the fuel elements and, thereby, for the core zone 1, no special throttling devices are required for equalizing or compensating the coolant outlet temperature. FIGS. 3 and 4 show schematically the disposition of the breeder reactor in the breeder zones 21 thereof in accordance with the invention. The construction of the breeder reactor core 1 is shown schematically within the thermal shield 3, the fuel elements, which both form the reactor core 1 and the breeder zones 21 being diagrammatically indicated by the subdivision thereof into vertical strips, the upper and lower ends thereof containing breeder material and the center portions thereof containing nuclear fuel. As can be seen in FIGS. 3 and 4, the reactive fuel elements forming the reactor core 1 are surrounded by a radial breeder mantle 2 of elongated breeder material elements 10 and have an upper and lower section 21 also of breeder material. Flow conducting devices 6 are provided in the breeder mantle 2 for forcing the flow 5 into the illustrated path of FIG. 3. In the left-hand half of FIG. 3, there is provided only one of such flow-conducting devices which constrains the flow within the breedermantle 2 to turn aside radially into the nuclear fuel zone 1. It should be noted especially that the coolant flow can penetrate into this breeder mantle zone 2 not only from the underside thereof but also from the lateral side thereof, that is from the intermediate space between the thermal shield 3 and the breeder mantle 2.

In the right-hand side of FIG. 3, several of such flow-conducting devices 6 are shown. They are alternatingly connected with the aid of electric cells 7 to the thermal shield 3 in the sense of a flow barrier connected or sealed with respect to the thermal shield. The illustrated flow path which travels back and forth in a meandering or sinuous manner in the breeder material is thereby produced, and has a considerably greater flow resistance than the flow path shown on the left-hand side of FIG. 3. It follows from this, that the sinuous or meander-shaped coolant flow in the breeder mantle 2 also influences the flow within the fuel element core 1 so that a better intermixing of the individual coolant thread-like streams in the spaces intermediate the individual fuel rods takes place and, thereby, the danger of so-called cold strands or streams are avoided. The illustrated dot-dash lines 10 define locations of equal pressure; they show that pressure differences at the foot of the individual breeder material elements are virtually nonexistent.

The flow conducting devices 6 can be formed, for example, of flat divider or partition sheets wherein the breeder material elements proper are mounted. The mounting support for these sheets can be provided by conventional structural members located at the locations of the breeder material elements. For probably the most frequent situation wherein the breeder material elements extend through the entire reactor core, it is expedient to construct the spacer supports that are required in any case in these elements so that no very great flow can take place in axial direction of the breeder material rods. In such case, the spacer supports are formed of perforated plates, in the bores of which for example three burls are provided for supporting and guiding the breeder material rods extending through the bores. The narrow gaps produced thereby are necessary for affording adequate heat removal from these fuel and breeder rod portions. Since these spacer supports are all disposed in the same or parallel planes, one or more flow conducting surfaces are thereby produced. The spacer supports of adjacent breeder material elements are elastically braced against one another so that no coolant flow can form therebetween, yet this arrangement will not hinder any subsequently required breeder material or fissionable fuel element replacement or exchange.

Whereas the arrangement of FIG. 3 corresponds in outer form to that of FIG. 1, the arrangement of FIG. 4 corresponds to that of FIG. 2 i.e. is furnished with a step-shaped core 1. In the left-hand half of FIG. 4 a device 8 for producing turbulent flow is located in the gap and between the middle and outer flow guide plates 6. The device 8 has a helical, screw-like shape which affords an additional intermixing of the individual flow threads or strands, as shown in FIG. 4. In the right-hand half of FIG. 4, the flow lines 5 as wall as the equal pressure lines 10 are additionally shown in the manner of FIG. 3. The characteristics of the step-shaped core with respect to the power-release in the individual fuel elements can also be superimposed by the retroaction of the meander-shaped coolant flow in the breeder mantle zones so that the shortest flow path exists in the central region of the core zone 1, which can be improved, moreover, by shortening the central combined breeder and fuel elements 9.

As seen in FIG. 4, the flow path in the breeder mantle zones 2 is not only markedly increased, but rather, through the transverse flow, an integration of the temperature increase over the power output or release of different fuel element zones is also attained so that the outlet temperature is compensated and permits extreme simplification of the replacement or exchange program for the elements of the breeder mantle. Whereas, in the present conventional system with closed breeder and fuel element cases or cans, the breeder material elements must be exchanged often during their lifetime, in order for them to respectively receive a suitable coolant traversal in the plutonium construction thereof, all breeder material elements in the herein proposed arrangement of the invention can remain in position if care is taken only that in the individual regions, uniform mixing of elements of varying age takes place. The adjustment of a uniform outlet temperature over the entire reactor cross section is greatly simplified by this integrating effect because only the total throughput must be accommodated or matched to the power produced in the breeder mantle which is virtually constant in equilibrium condition.

As mentioned hereinbefore, the radial flow in the breeder mantle provides the advantage that in the coolant flow of the core region a strong transverse intermixing is stimulated which contributes to the reduction of temperature peaks. This produces the further advantage, however, that when the liquid coolant metal boils, there is no danger anymore of propagation i.e. no abrupt boiling can occur anymore within very large regions of the reactor core as a result of the delay in boiling in the sodium which, for the state of the art, was also a reason for maintaining the closed fuel elements, that is the fuel element cans, cases or boxes.

Figure 3A:
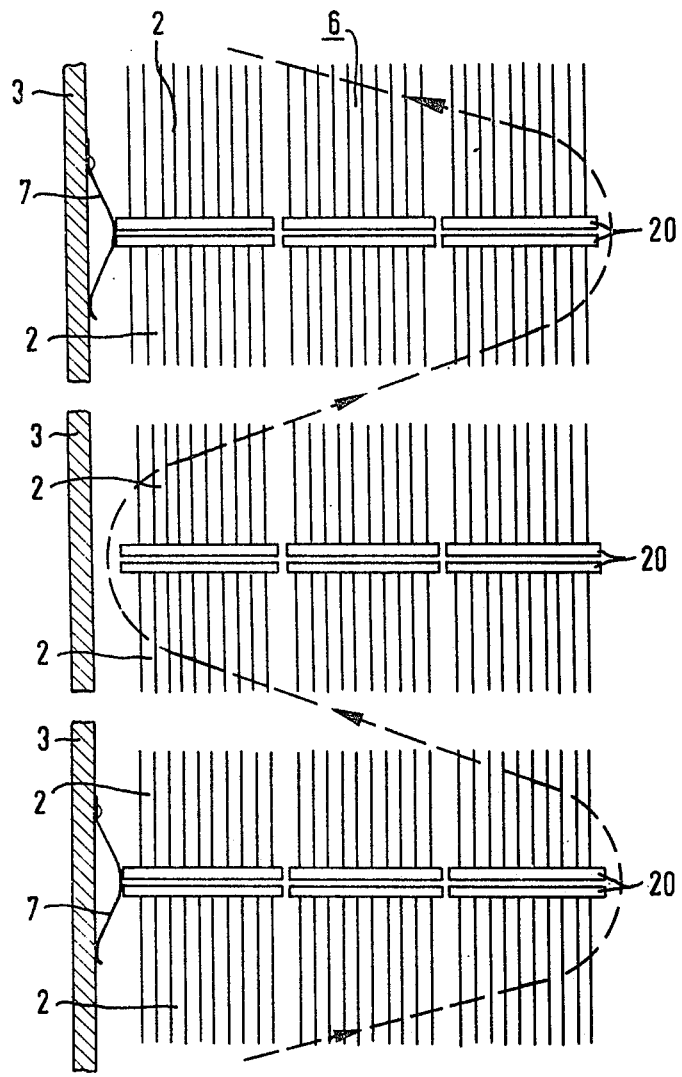
FIG. 3a is a further enlarged fragmentary view of FIG. 3.

In the embodiment of FIG. 3a, the reactor core or, in fact, the section of breeder zone thereof, is composed of breeder material elements 2 disposed parallel to one another. The breeder elements 2 are assembled in bundles, in a conventional manner, with the aid of rod holder plates 20 which simultaneously provide flow guidance surfaces and are sealed from the thermal shield 3 by elastic or resilient annular ribs 7 which, as shown in FIG. 3a, are formed of springs secured at one side thereof.

Figure 4A:
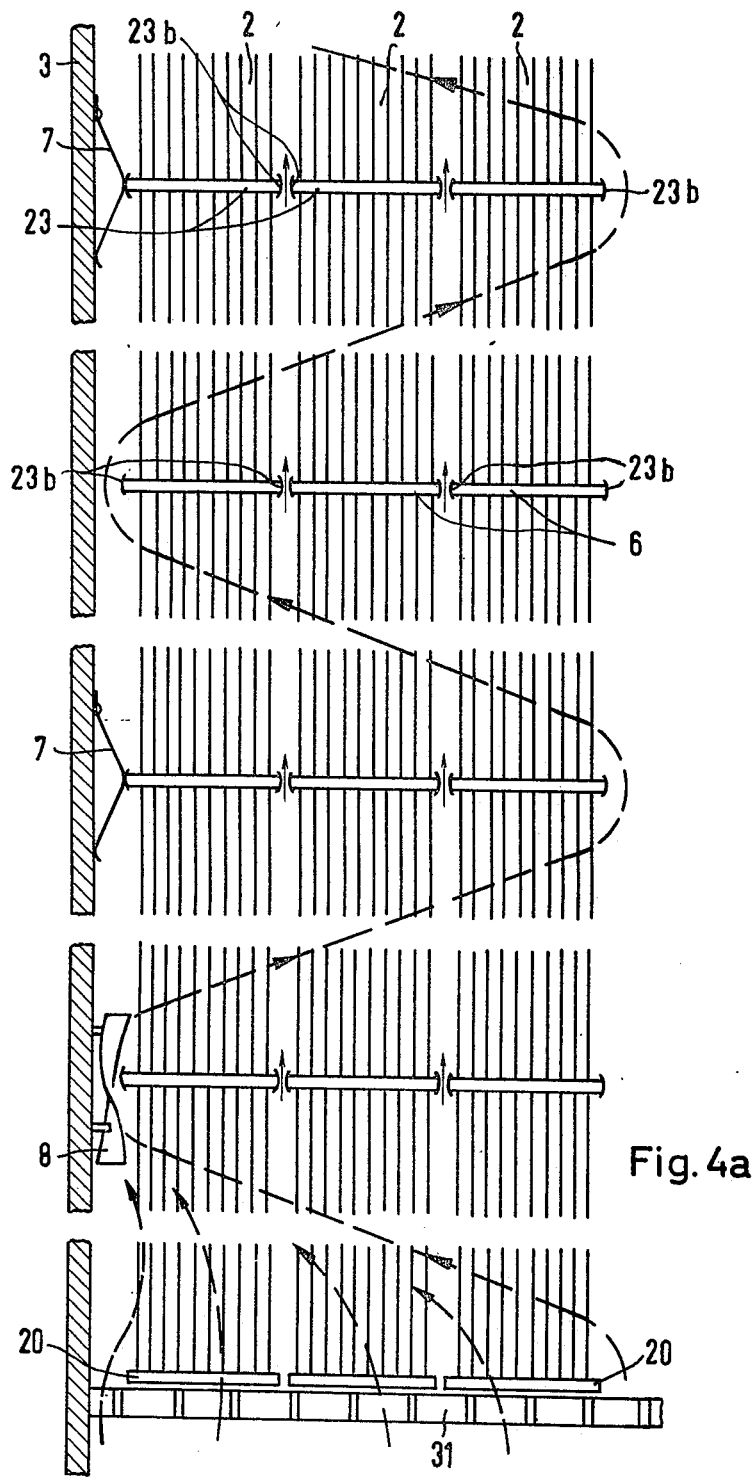
FIG. 4a is a further enlarged fragmentary view of FIG. 4.

In the other embodiment of the invention shown in FIG. 4a, the breeder material elements 2 extend respectively through the entire length of the reactor core. In the embodiment of FIG. 4a, the flow guidance surfaces are provided by spacer members 23 which are disposed at the same level. The spacer members 23 are provided with sliding surfaces 23b at the edges thereof so that, when assembling the reactor core or, in the special case shown in FIG. 4a, in the assembly of the breeder zone or mantle, a bunching or blocking of the breeder material elements 2 is prevented. As in the embodiment of FIG. 3a, the sealing of the spacer members 23 from the thermal shield 3 is effected by elastic or resilient annular ribs 7. At the lower end of the reactor core, the breeder material elements 2 are held in a lower rod holder plate 20 which is mounted on a support grid 31 through which coolant flow is admitted to the reactor core. Turbulence generating devices 8 are located in the annular gap between the thermal shield 3, on the one hand, and, on the other hand, the plane in which the spacer members 23 forming the flow guidance surfaces 6 are disposed. The specific construction of the turbulence generating devices 8 forms no part of the subject of the present invention and belongs to the general state of the art.

Figure 4B:
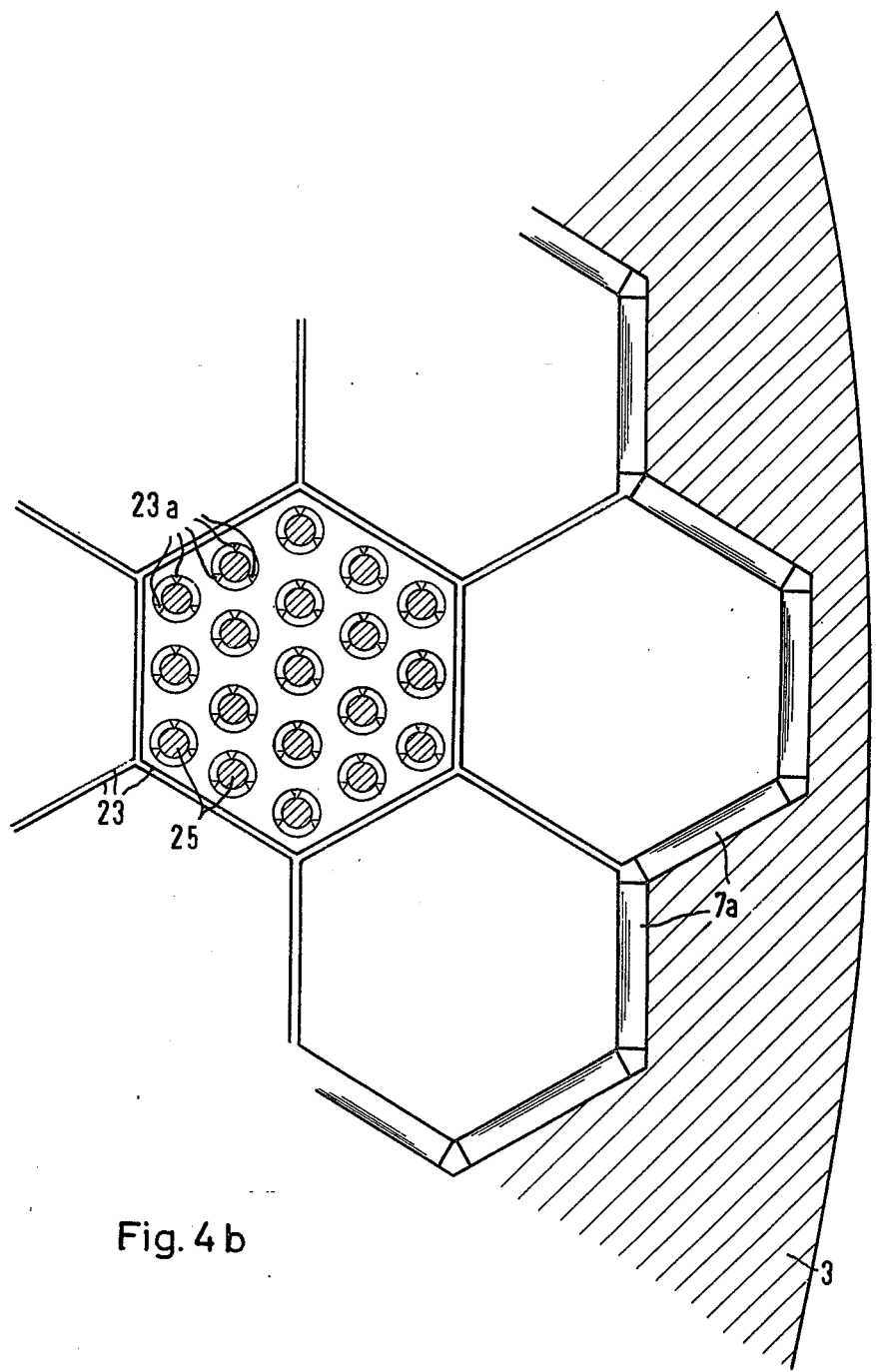
FIG. 4b is an enlarged cross-sectional view of FIG. 4a taken along the line IVb — IVb.

In FIG. 4b, there is shown a small section in top plan view of a flow guidance surface 6. Breeder material elements, or the spacer holder 23 therefor, are hexagonal and are formed with bores for receiving therein the individual breeder material rods 25. The bores formed in the breeder material elements contain radially inwardly directed projections or burls, for example three in number, for centering the rods 25. For such construction of the reactor core, wherein the elements are of hexagonal cross section, the thermal shield 3 is provided with a corresponding inner contour, and the elastic or resilient annular ribs 7 are formed of individual rectilinear portions 7a. The portions or sealing elements 7a can, of course, also have other constructions which depend in each case upon other structural conditions of the reactor per se, and do not limit the field of use of the invention of the instant application. The resilient or elastic parts 7a are securable to the thermal shield 3 by means of bolts or by welding, for example. As can be readily seen, the exact means for elastically or resiliently securing the flow guide devices at alternate levels to the boundary wall is immaterial, and may be effected in any convenient manner by the man of ordinary skill in the art. The inventive feature lies in the fact that the flow guide devices are secured elastically to the boundary wall.

The sliding surfaces 23b of the spacer members 23 normally contact each other very lightly and the amount of coolant flow which passes therebetween is so little at the plane or the level at which the devices 8 which produce turbulence are located, that such flow is almost negligible. This also applies to the coolant flow through the mesh opening of the spacers 23 according to FIG. 4b which is of such quantity that cooling of the fuel rods 2 is also adequate in the vicinity of the spacer plane or level. The centered projections 23a in the space or bores insures that the spacing between the encasing tube and the wall of the bore is approximately equal all around. At the beginning or reactor operation, the fuel rod only loosely engages those projections 23a. At the end of the operating period, however, the fuel rod encasing tube may actually tightly engage these projections due to the swelling of the fuel rod.

At the other flow guide surfaces which are sealed by the elastic ribs 7 against the thermal shield 3, there occurs a distribution of the coolant flow as viewed in FIG. 4, left-hand side. Due to the considerably higher flow resistance and the tortuous, sinuous path of the coolant flow the desired longer dwell period of the coolant and the quantitative throttling thereof in the breeding region or section of the reactor is provided without the occurrence of any stagnating coolant zones. This is also insured by the small quantities of coolant flow which pass through the planes or levels at which the spacer members are located.

The construction of the resilient or elastic annular ribs 7 can be seen in FIGS. 3a, 4a and 4b. There is no rigid connection between the elastic ribs 7 and the spacer member levels or planes of the fuel rods or the rod holder plates 20 for partial fuel elements that are mounted above one another. The resiliency of these parts is necessary to avoid mechanical difficulties in the fuel element exchange during operation of the nuclear reactor.

At the left-hand side of FIG. 4, the flow resistance in the region of the turbulence-producing devices 8 is much lower than along the fuel rods at the height of the respective spacer planes or levels. As a result, almost the entire coolant flow will travel across these turbulence-producing devices 8. The spacer plates or grids located above and below the devices 8 are pressed together edgewise by the resilient or elastic rib members 7 so that an increased flow resistance will occur over the entire cross-section of the breeding mantle, and coolant flow, therefore, assumes the course shown in FIG. 4. The spacers 23 which function as flow guide devices are secured in a conventional manner either to individual fuel rods of the fuel element or to a support frame disposed therein. These, features, however, are known in the art and are part of the general knowledge of engineers working in this field so that it is believed to be unnecessary to describe in detail such known design features. The specific construction of the turbulence generating devices 8 forms no part of the subject of the present invention and belongs to the general state of the art.

The resilient or elastic part 7a are securable to the thermal shield 3 by means of bolts or by welding, for example. The exact means for elastically or resiliently securing these flow guide devices at alternate levels to the boundary wall is immaterial and may be effected in any convenient manner by the man of ordinary skill in the art. The inventive feature lies in the fact that the flow guide devices are secured elastically to the boundary wall.

It should be also noted that due to the transverse inward flow of the coolant from the outer gap between the breeder mantle 2 and the thermal shield 3, only part of the coolant flow acts in vertical direction so that, accordingly, in connection with the pressure distribution in the entire breeder reactor core, a safety device to protect against upward floating can possibly be dispensed with. By means of the proposed flow guide devices 6 according to the invention, a considerably simplified construction of the entire reactor core is afforded; all of the elements, both fuel elements and breeder material elements can be produced with the open side or canless type of construction. The economies in absorption material associated therewith increases the breeding rate. Special throttle devices, which must be adjustable during the operation of the reactor, are dispensible and, moreover, due to the retroactions of the transverse flow on the central part of the reactor core, the dangers associated with the delay in boiling of the sodium are avoided. The embodiments of the flow-conducting devices described, for example, hereinbefore, that is, in one case with the aid of spacer supports, and, in another case, with the aid of flow guide plates at the fuel elements located above one another at the connecting position, can also have other possible constructions that result from the construction and assembly of the individual fuel and breeder material elements. These advantages characteristics of the flow guiding device of the invention are of value obviously not only for liquid metal-cooled fast breeder reactors, as are preferably found today in development, but also, for example, for vapor-cooled or compressed gas-cooled fast breeder reactors. Also, the employment of this principle is not limited to fast breeder reactors, but rather its use is advantageous for every type of reactor having canless fuel elements, thus, for example, even for thermal light water reactors of the pressurized water type.

I claim:

1. Fluid-cooled fast breeder reactor comprising an outer cylindrical boundary wall, a plurality of canless fuel elements and breeder material elements received within said boundary wall and being in an array therein forming a fissionable fuel zone and a breeder material zone coaxially surrounding said fissionable fuel zone, a coolant supply system for applying fluid coolant at uniform pressure to the entire cross section within said cylindrical boundary wall, and flow guide devices extending substantially horizontally and disposed at different levels one above the other within said breeder material zone which coaxially surrounds said fissionable fuel zone, means for elastically securing the flow guide devices at alternate levels within said breeder material elements to said boundary wall, the flow guide devices at the levels intermediate said alternate levels being spaced by an annular gap from said boundary wall.

2. Fast breeder reactor according to claim 1 wherein said flow guide devices are formed of spacer supports, said flow guide devices being disposed in gaps respectively at the levels of said spacer supports for said breeder material elements and the ends of the latter, said spacer support being of such dimension as to fill the gaps between individual breeder material rods forming said elements and the end pieces of said elements to an extent that a limited longitudinal flow of the coolant along said rods is possible.

3. Fast breeder reactor according to claim 1 wherein said flow guide devices are annular in shape and are formed with radially extending heat expansion joints.

4. Fast breeder reactor according to claim 1 including devices for producing turbulent coolant flow disposed in said annular gap.

5. fast breeder reactor according to claim 4 including mounting structures for holding said flow guide devices, said mounting structures being disposed in breeder element positions and extending in axial direction through said breeder material zone.

6. Fast breeder reactor according to claim 1 wherein said flow guide devices are formed of spacer supports for said breeder material elements, said spacer supports being disposed in substantially horizontal planes.

7. Fast breeder reactor according to claim 6 wherein the spacer supports of adjacent breeder material elements abut one another elastically in a sealing manner.

* * * * *